United States Patent [19]

Gold et al.

[11] Patent Number: 5,074,645
[45] Date of Patent: Dec. 24, 1991

[54] FULL COLOR THREE DIMENSIONAL DISPLAY SYSTEM

[75] Inventors: Ronald S. Gold, Fullerton, Calif.; Karen E. Jachimowicz, Goodyear, Ariz.; William R. Hancock, Phoenix, Ariz.; Louis W. Silverstein, Scottsdale, Ariz.

[73] Assignee: Honeywell Inc., Minneapolis, Minn.

[21] Appl. No.: 589,735

[22] Filed: Sep. 28, 1990

[51] Int. Cl.[5] .................. G02B 27/14; G02B 27/26; G02B 27/28
[52] U.S. Cl. ........................... 359/465; 353/8; 353/31; 359/498; 359/638
[58] Field of Search ............... 350/132, 402, 404, 173; 353/8, 31, 33

[56] References Cited

U.S. PATENT DOCUMENTS

| 2,449,287 | 9/1948 | Flood | 350/173 |
|---|---|---|---|
| 2,623,433 | 12/1952 | Stipek . | |
| 2,754,718 | 7/1956 | Rock et al. | 350/173 |
| 2,811,077 | 10/1957 | Wiemer et al. . | |
| 3,221,600 | 12/1965 | Land et al. . | |
| 3,497,283 | 2/1970 | Law . | |
| 3,507,549 | 4/1970 | Land | 350/132 |
| 4,191,456 | 3/1980 | Hong et al. | 353/31 |
| 4,256,368 | 3/1981 | Task . | |
| 4,714,319 | 12/1987 | Zeevi et al. | 350/132 |
| 4,792,850 | 12/1988 | Liptoh et al. | 350/132 |
| 4,842,374 | 6/1989 | Ledebuhr | 353/31 |
| 4,870,486 | 9/1989 | Nakagawa et al. | 350/132 |

Primary Examiner—Bruce Y. Arnold
Assistant Examiner—Martin Lerner
Attorney, Agent, or Firm—John G. Shudy, Jr.

[57] ABSTRACT

A full color 3D projection display using wavelength separation which, through a combination of retarders, prisms and dichroic and polarizing coatings, takes linearly polarized red and green light of p orientation from left and right images and blue linearly polarized light of p orientation from one of the views or a common image, and presents the light for projection having green and red light of one polarization orientation for one view and red and green light of a polarization with another orientation for providing the 3D components of the image. The blue light component is presented alternately in one of both polarization orientations to be perceived with the left and right views, respectively.

12 Claims, 5 Drawing Sheets

FULL COLOR THREE DIMENSIONAL DISPLAY SYSTEM

FIELD OF THE INVENTION

The present invention pertains to projection display systems and particularly to color systems. More particularly, the invention pertains to color three dimensional (3D) systems.

BACKGROUND OF THE INVENTION

In the related art, there are various kinds of 3D color projection and/or display systems. One approach has two projectors or display systems, where one projector provides a right eye display and the other a left eye display on a screen, each display having its own polarization, for instance, "p" and "s", respectively. The viewer wears polarized glasses which let the eyes see a stereoscopic display for 3D viewing. Another system has a single display that interlaces right and left eye images, each image having its own polarization. The images are perceived by the eyes through polarized glasses for 3D viewing. While there are many 3D color display systems in the art, this invention is unique in that only the blue channel requires time multiplexing and can be generated at a much lower resolution and bandwidth.

SUMMARY OF THE INVENTION

The present invention provides a compact, high resolution, full color 3D display system using a single projection display. The invention permits the use of flat panel, high resolution and luminance cathode ray tube (CRT), light valve or laser projection systems wherein color addition typically generates a full color image. That is, the invention takes advantage the principles of color combining schemes that accommodate the combined colors' polarizations, which are applicable to the present 3D scheme.

The advantages of the present invention are a single display system that uses front or rear projection, higher 3D color image resolution than that of combining multicolor displays, greater luminance than that of the full color, dual channel approaches of similar physical size, higher image resolution than that of typical time-multiplex systems, which must operate at 120 hertz (Hz) field rate, minimal interocular crosstalk due to the elimination of timing and resulting sync problems of 120 Hz operation, flexibility of using separate processors to generate images in parallel for each eye, compatibility with liquid crystal displays which generate polarized images, and the implementation of dichroic image combiners which have very high polarized light efficiencies. The invention can be used to easily convert present commercial and military full color projection systems to 3D without loss of resolution.

The present stereoscopic 3D projection display has color image components which are separated such that the short wavelength image components which contribute little to visual spatial resolution or the processing of the stereo information, are presented at much lower resolution than the mid-wavelength (green) and long wavelength (red) components. This permits utilizing dual high resolution red/green image sources (left eye view and right eye view) as the primary image sources, while incorporating a single much lower resolution monochrome blue image source (i.e., "splitting out the blue image").

DESCRIPTION OF THE SPECIFIC EMBODIMENTS

Figures 1A, 1B:
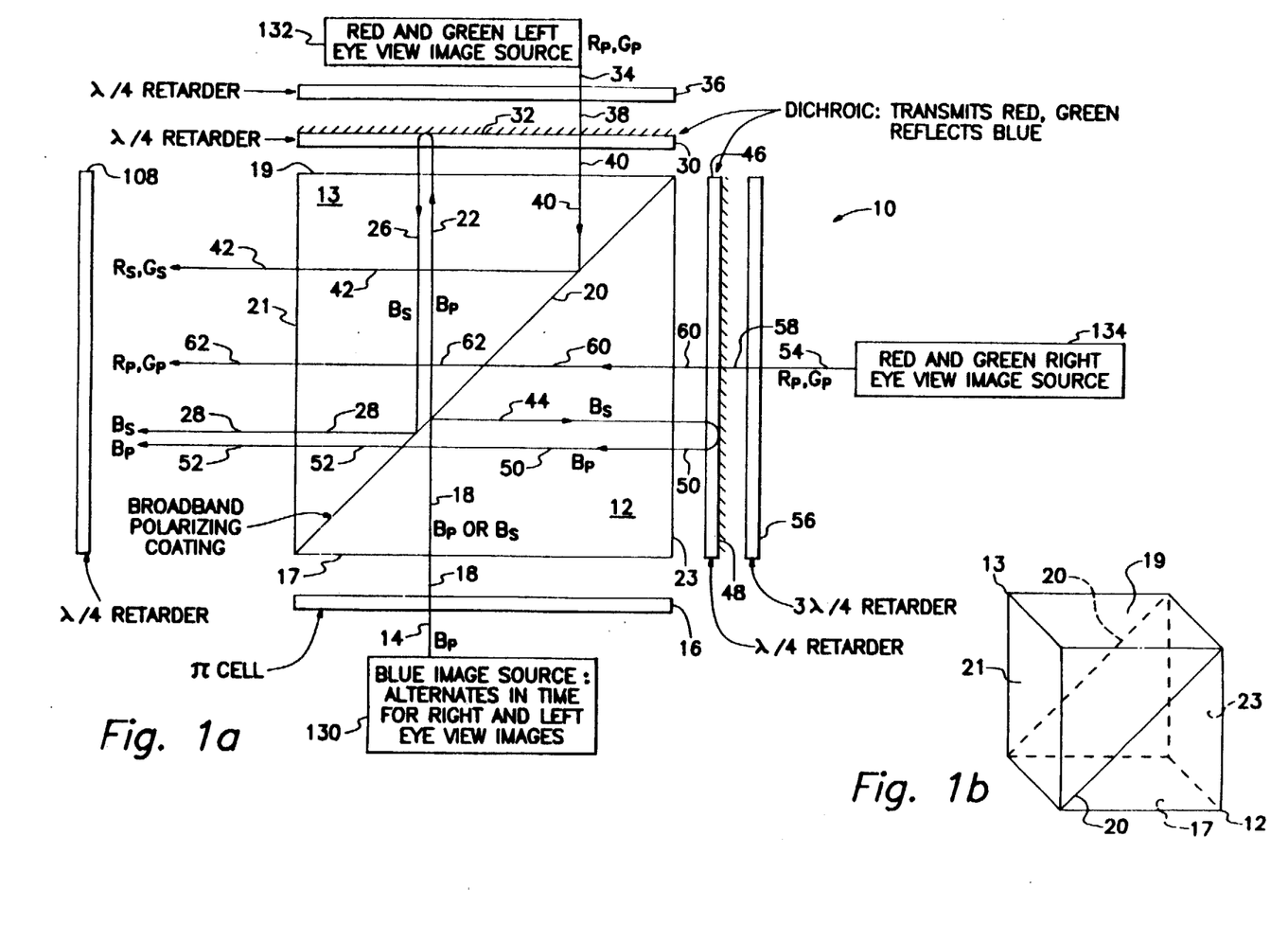
FIGS. 1a and 1b show a bi-prism embodiment of the invention.
Figure 2A:
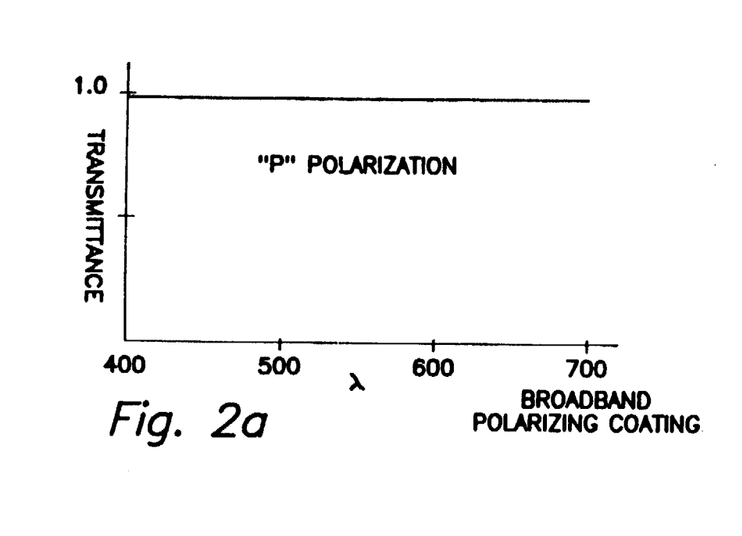
FIGS. 2a–b reveal the transmitting properties of the broadband polarizing beam combining coating for the bi-prism embodiment.
Figure 2B:
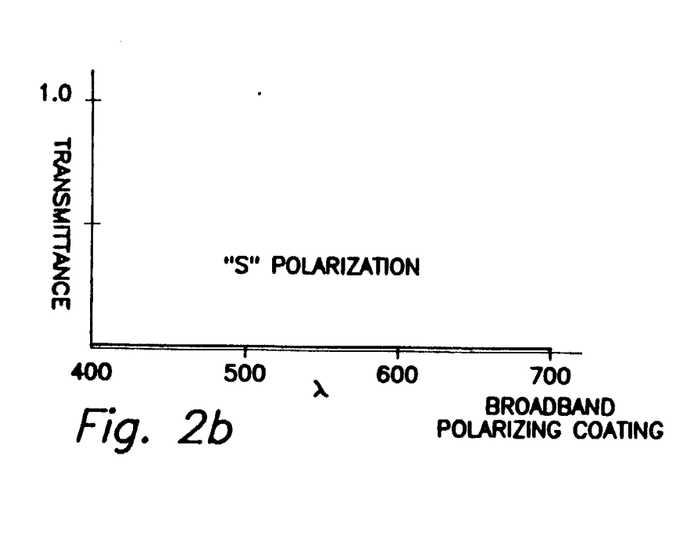

Embodiment 10 is a bi-prism 12-13 as illustrated in FIGS. 1a and 1b. Incidentally, multiple variations of embodiment 10 are possible, for example, having reversed left and right eye view image sources. In the present variation of embodiment 10, blue image light beam 14 from blue image source 130 passes through a $\pi$ cell or electronic half wave retarder 16. Blue light beam 14 has a linear polarization with an orientation of "p" which is turned into orientation of "s" when $\pi$ cell or electronic half wave retarder 16 is on. When electronic retarder 16 or $\pi$ cell 16 is off, then the polarization orientation of light beam 14 remains the same. When the blue image source 130 is to be presenting a left eye image, then retarder 16 is in an off state and beam 14, in p oriented linear polarization, passes through retarder 16 without a change in its polarization orientation but becomes light beam 18 in FIG. 1a with the p oriented linear polarization and passes through side 17 and broad band polarizing coating 20 of prisms 12 and 13. When beam 18 passes through coating 20 into prism 13, it is designated as being 22 with still having the p oriented linear polarization. Beam 22 exits side 19 of prism 13 and enters a quarter wave retarder 30, with its fast axis at 45° to the incident linear polarization. Beam 22 entering retarder 30 has its incident linear polarization changed to circular polarization. Then beam 22 is reflected off of a dichroic coating 32, and has its circular polarization reversed and that blue beam becomes beam 26 in FIG. 1a. Dichroic coating 32 on retarder 30 transmits red and green light and reflects blue, as revealed in FIGS. 2c and 2d. Beam 26 emerges from quarter wave retarder 30 having linear polarization of orientation s and enters prism 13 through side 19. Beam 26 continues until it impinges coating 20 and is reflected by coating 20 as blue beam 28, having a linear polarization of orientation s. The characteristics of coating 20 are shown in FIGS. 2a and 2b which reveal the high transmittance of light having a linear polarization of p orientation and an extremely small transmittance of light with linear polarization of an s orientation. Blue light beam 28 is projected out of prism 13 through side 21 during the period of time when the blue image generator is presenting a left eye image. From a red and green left eye image source 132 is light beam 34 having the colors red and green, and a linear polarization with a p orientation. Light beam 34 enters quarter wave retarder 36 which changes the polarization of light beam 34 from linear to circular as it exits retarder 36 as beam 38 which passes through dichroic coating 32, as it transmits red and green light and reflects blue. Light beam 38 passes through retarder 30 and emerges as light beam 40, having a linear polarization of s orientation. Light beam 40 enters prism 13 through side 19 and impinges coating 20 and is reflected by coating 20 as light beam 42 having linear polarization of the s orientation. Red and green beam 42 is projected out of prism 13 through side 21 for presenting the left eye stereo component for red and green.

Figure 2C:
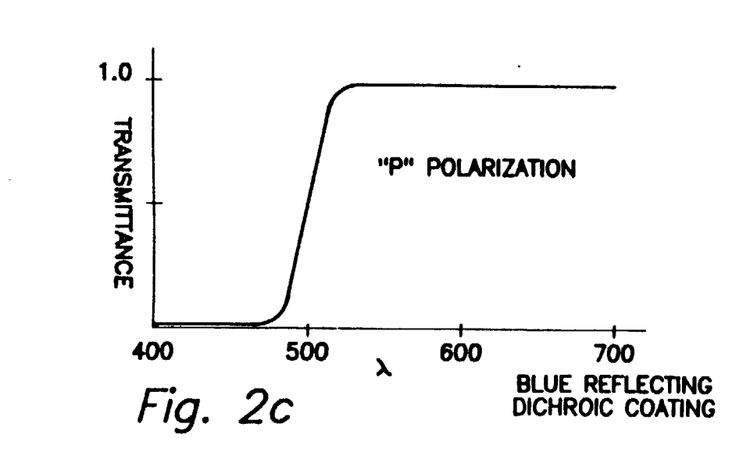
FIGS. 2c–d reveal the transmitting properties of the blue reflecting dichroic coating used for the bi-prism embodiment.
Figure 2D:
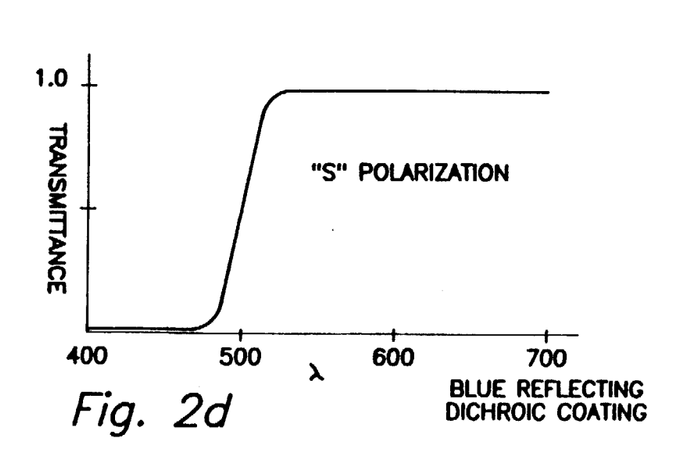

Returning to blue beam 14 of linear polarization with p orientation, its path may be noted when $\pi$ cell or electronic half wave retarder 16 is on or in effect. Here, when blue image source 130 presents a right eye image, light beam 14 passes through $\pi$ cell or electronic retarder 16 which is on or in an excited state. Light beam 14 emerges as light beam 18 having linear polarization with its orientation changed to s. Light beam 18 enters prism 12 through side 17 and continues until it impinges coating 20 and is reflected by coating 20 as beam 44 which emerges out of prism 12 through side 23 and enters quarter wave retarder 46 and is reflected by dichroic coating 48 which transmits red and green light and reflects blue light, as indicated by FIGS. 2c and 2d. Light beam 44 emerges from retarder 46 as light beam 50 having a linear polarization of p orientation. Light beam 50 enters prism 12 through side 23 and continues on through polarizing coating 20 to become beam 52 that goes through prism 13 and is projected from prism 13 through side 21. The transmittance of light with a linear polarization of p orientation through coating 20 is illustrated in FIG. 2a. Blue beam 52 is viewed as a right eye image. Right eye image source 134 presents red and green beam 54 having a linear polarization with a p orientation, which passes through three quarter wave retarder 56 and emerges as beam 58, having circular polarization. Beam 58 passes through dichroic coating 48 as coating 48 transmits red and green and reflects blue light. Light beam 58 passes through quarter wave retarder 46 and emerges as beam 60, having a linear polarization with a p orientation. Beam 60 enters prism 12 through side 23 and passes through coating 20 on in to prism 13 as beam 62. Beam 62 is projected out of prism 13 through side 21 as a red and green light beam of linear polarization with p orientation representing the right eye red and green image of a 3D projection display. Beam 62 combines with beam 52 to present the full color right eye image and beam 42 combines with beam 28 to provide a full color left eye image. The left and right eye images, having different polarizations, may be presented to the viewer as a 3D full color display utilizing polarization sensitive techniques that present the left and right images respectively to the left and right eyes of the viewer or viewers.

Figures 3A, 3B:
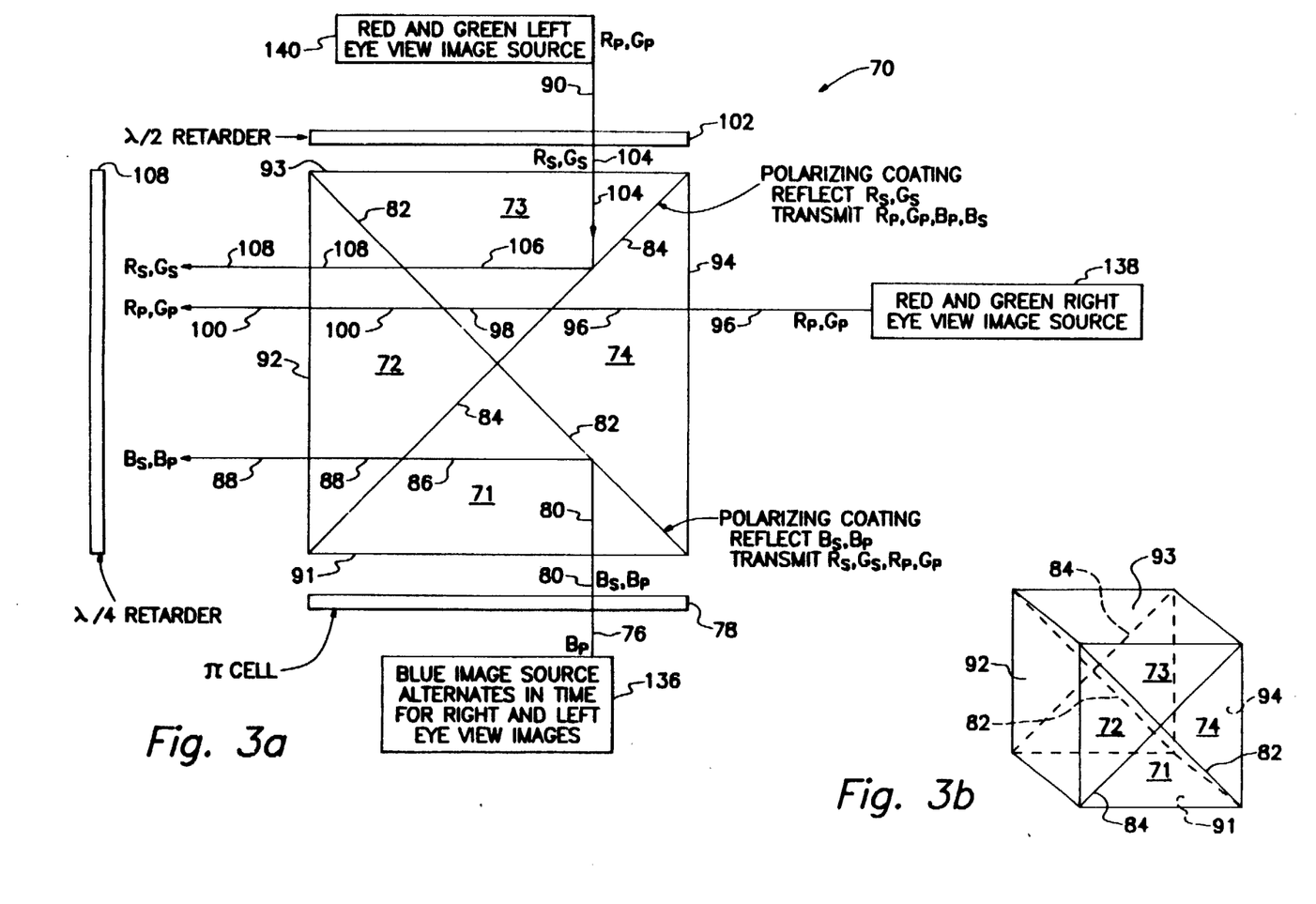
FIGS. 3a and 3b show the quad prism embodiment of the invention.

An alternate beam combining embodiment 70 for the full color 3D projection display having a quad prism illustrated in FIGS. 3a and 3b, may be utilized. Blue light beam 76 from image source 136 representing right and left eye views, has a linear polarization of p orientation. Beam 76 passes through $\pi$ cell or electronic retarder 78 while electronic retarder 78 is in the off state. When passing through retarder 78, beam 76 becomes beam 80 which enters prism 71 through face 91 and impinges coating 82 which is a polarizing coating that reflects blue light and transmits red and green light, as shown by the characteristic curves in FIGS. 4c and 4d.

Figure 4A:
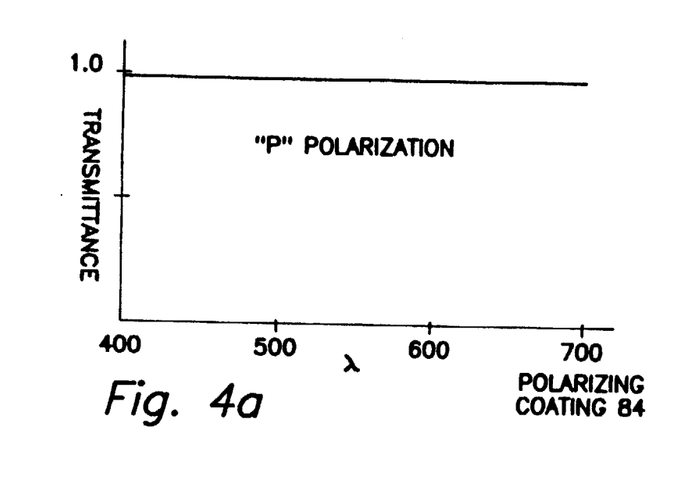
FIGS. 4a–d reveal the transmitting properties of the polarizing beam combining coatings A and B for the quad prism embodiment.
Figure 4B:
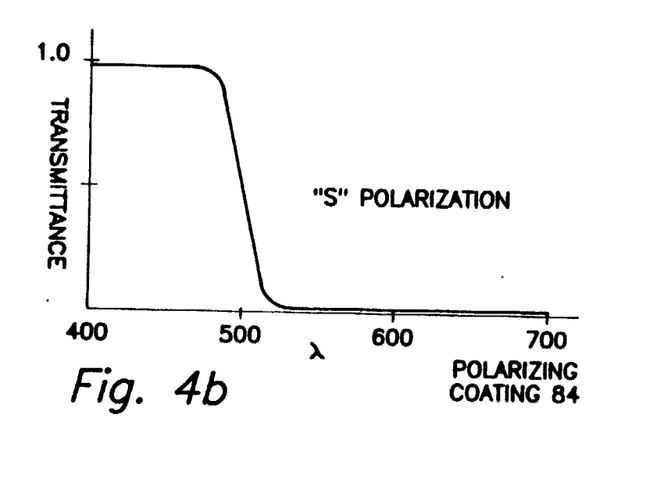
Figure 4C:
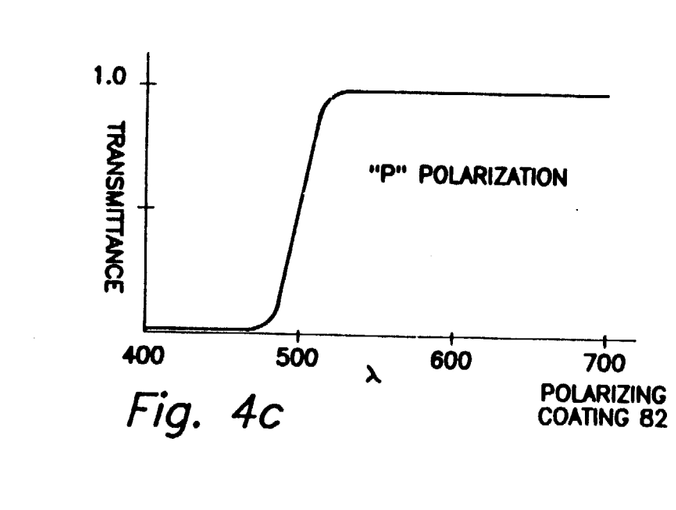
Figure 4D:
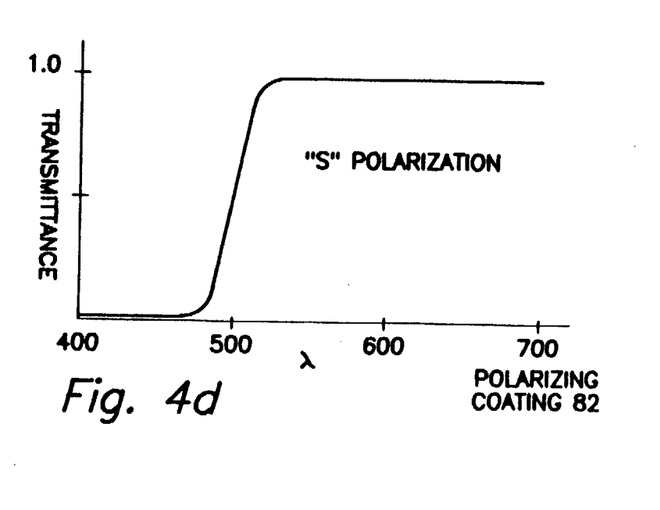

Beam 80 is reflected as beam 86, which passes through coating 84 which is a polarizing coating which reflects red and green light of linear polarization of s orientation and transmits red, green and blue light of linear polarization with p orientation and blue light of linear polarization of s orientation, as shown by characteristic curves of FIGS. 4a and 4b. As beam 86 passes through coating 84 it becomes beam 88. Then beam 88 passes through prism 72 and is projected on out through side 92 as blue light beam 88 of linear polarization having a p orientation. When $\pi$ cell or the electronic half-wave retarder 78 is in an on state and blue beam 76 having linear polarization of p orientation passes through retarder 78, it becomes beam 80, which has an s orientation in lieu of the p orientation. Beam 80 enters through side 91 into prism 71 and impinges coating 82 which reflects blue light of a linear polarization having an s orientation. Reflected beam 86 passes on through coating 84 which transmits blue light having a linear polarization of s orientation as shown by FIGS. 4a and 4b. Beam 86 becomes 88 as it enters prism 72. Beam 88 exits prism 72 through side 92 as linearly polarization blue light having an s orientation. Red and green light beam 96 comes from the right eye view image source 138 in a linear p orientation and enters prism 74 through side 94. Beam 96 passes through coating 84 which transmits linearly polarized red and green light of a p orientation. Beam 96 passes through prism 73 as beam 98 and on through coating 82 which transmits red and green light of a linear polarization and p orientation. As red and green light beam 98 enters 72 it becomes beam 100 which passes through prism 72 on out through side 92. Alternatively, beam 96 may pass through coating 82 and on through prism 71 and then through coating 84 on through prism 72 and exiting through side 92 as beam 100. Similarly, beam 76, whether it passes through retarder 78 in an on or an off state, may first pass through coating 84, after going through prism 71, on through prism 72 and then be reflected by coating 82 on through prism 72, thereby exiting through side 92 as beam 88.

Red and green beam 90 of linear polarization with p orientation originates from the left eye view image source 140 and passes through half-wave retarder 102 and emerges as beam 104 having an s orientation. Beam 104 enters prism 73 through side 93 and impinges coating 84 which reflects linearly polarized red and green light having an s orientation. The red and green light beam 104 is reflected as beam 106 which passes on through prism 73 and through coating 82 which transmits red and green light of linear polarization with an s orientation. As beam 106 passes through coating 82, it becomes beam 107 which transits prism 72 and goes out through side 92. Alternatively, beam 90 may pass through retarder 102 and as beam 104 pass through coating 82 before being reflected by coating 84. After first passing through coating 82, the beam is reflected by coating 84 as beam 107 which also exits prism 72 through side 92.

Figure 5:
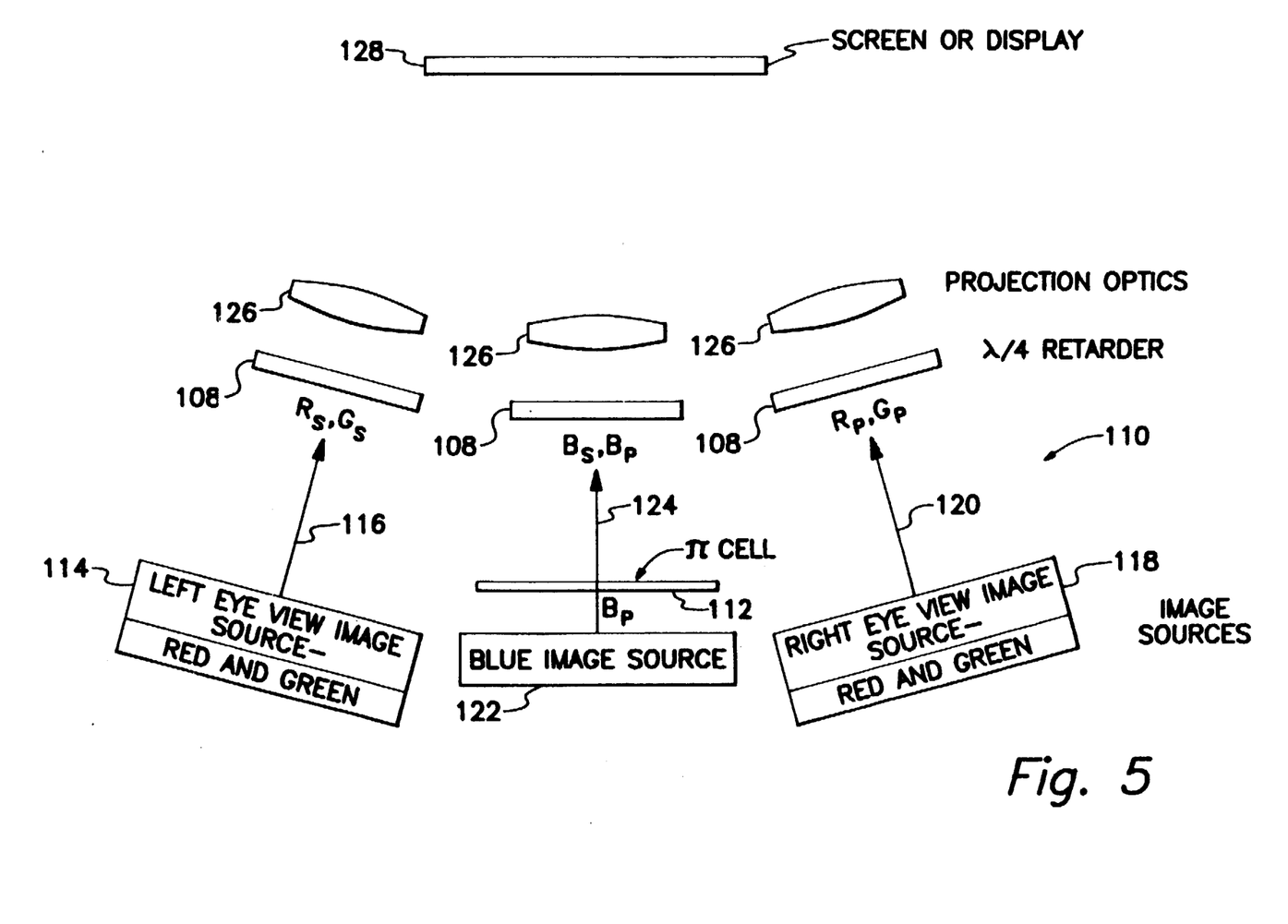
FIG. 5 illustrates a projection embodiment of the invention.

Embodiment 110 (in FIG. 5) is a projection system, not utilizing a prism, that uses polarization discrimination for left and right images for 3D displaying of color images. Red and green light beam 116 having a linear polarization of orientation s from left eye image source 114 is projected onto a screen or display 128 through optics 126. Red and green light beam 120 having a linear polarization of orientation p from right image source 118 is projected onto screen or display 128 through optics 126. Blue light beam 124 having a linear polarization of orientation p from common image source 122 is projected on to screen or display 128 through a π cell or electronic half-wave retarder 112. When π cell or retarder 112 is in an "on" state, blue light beam 124 has its orientation change from p to s. When retarder 112 is in an "off" state, blue light beam 124 maintains its p orientation. Thus, beam 124 in p orientation is combined with right eye image beam 120 and beam 124 in s orientation is combined with left eye image beam 116. Polarization discrimination techniques known in the art may be used to enable the viewer to view a 3D color image on screen or display 128. Quarter-wave retarder 108 may be used to convert the linear polarization of the image light beams to circular polarization.

The short wavelength image components, that is, the blue light, contribute little to visual spatial resolution or the processing of stereo information. Thus, the blue light is presented at a much lower resolution than the mid-wavelength (green) and the long wavelength (red) components. This permits utilizing dual high resolution red and green image sources for the left eye and right eye stereo views as the primary image sources, while incorporating a single and much lower resolution monochrome blue image source as being common for both eye views. Only one blue image light view is presented for both eyes. In both embodiments 10 and 70, the red and green image for the left view is projected as linearly polarized light of an s orientation and the red and green image for the right view is projected as linearly polarized light having a p orientation. The blue light comes from an image which is common to the right and left views. The blue light is projected out of the prism alternately as p and s orientation linearly polarized light at a rate that is the same as the rate that the π cell or electronic retarder 16 or 78, respectively, is switched on and off. Thus, the right projected view consists of red and green and blue light of a linear polarization with a p orientation and from the left view is red, green and blue light of a linear polarization with an s orientation. In summary, the red and green is always present for both views and the blue alternates between the views. Thus, utilization of polarizing glasses or other polarization discrimination techniques, as known in the art, may be used to perceive the full color 3D resultant image. The projected light beams, prior to entering the projection optics, may transit a quarter wave retarder 108 which converts the linearly polarized output light to circularly polarized light having a left hand or right hand polarization differentiated by the former respective orientation of the linearly polarized light.

We claim:

1. A full color three dimensional display system comprising:
   a first prism;
   a first optical film, proximate to a first side of said first prism, for transmitting light having a first polarization and reflecting light having a second polarization;
   a second prism having a first side proximate to said first optical film;
   a first quarter wave retarder proximate to a second face of said first prism;
   a second optical film, proximate to said first one quarter wave retarder, for transmitting first color long to medium wavelength light and reflecting second color short wavelength light;
   a three quarter wave retarder proximate to said second optical film and said first one quarter wave retarder;
   a second one quarter wave retarder proximate to a second side of said second prism;
   a third optical film, on said second one quarter wave retarder, for transmitting first color long to medium wavelength light and reflecting second color short wavelength light;
   a third one quarter wave retarder proximate to said third optical film and said second one quarter wave retarder; and
   a switchable one quarter wave retarder proximate to a third side of said first prism.

2. Display system of claim 1 wherein:
   a first light from a first image, having a first color and a first polarization, goes through said three quarter wave retarder, said second optical film, said first prism, said first film and said second prism;
   a second light from a second image, having a first color and a first polarization, goes through said third one quarter wave retarder, said third optical film, said second one quarter wave retarder, and having a second polarization enters said second prism through the second side, is reflected by said first optical film, and exits said second prism through a third side; p1 a third light from a common image having a second color and a first polarization, goes through said switchable retarder that alternates between an "on" state and an "off" state, the third light going through said retarder in the "on" state changes from the first polarization to a second polarization, enters said first prism through the third side, is reflected by said first optical film, exits said first prism through the second side, goes through said first one quarter wave retarder, is reflected by said second optical film back through said first one quarter wave retarder, having changed from the second to the first polarization, reenters said first prism through the second side, goes through said first optical film, enters said second prism and exits said second prism through the third side; and
   the third light going through said switchable retarder in the "off" state, enters said first prism through the third side, goes through said first optical film, enters said second prism, exits said second prism through the second side, goes through said second one quarter wave retarder, is reflected by said third optical film, returns through and exits said second one quarter wave retarder, having the second polarization, enters said second prism through the second side, impinges said first optical film and is reflected out of said second prism through the third face.

3. Display system of claim 2 further comprising a fourth one quarter wave retarder proximate to the third side of said second prism wherein:
   the first and third light, exiting said second prism through the third side and having the first polarization, enter said fourth one quarter wave retarder and exit said fourth one quarter wave retarder, having a third polarization; and
   the second and third light, exiting said second prism through the third side and having the second polarization, enter said fourth one quarter wave retarder and exit said fourth one quarter wave retarder, having a fourth polarization.

4. Display system of claim 3 wherein:
the first color is red and green;
the second color is blue;
the first polarization is a linear polarization having a p orientation;
the second polarization is a linear polarization having an s orientation;
the third polarization is a left circular polarization; and
the fourth polarization is a right circular polarization.

5. A full color, three dimensional display system comprising:
a first prism;
a second prism having a first side proximate to a first side of said first prism;
a third prism having a first side proximate to a second side of said second prism;
a fourth prism having a first side proximate to a second side of said third prism and having a second side proximate to a second side of said first prism;
a first optical film situated between the first sides of said first and second prisms and between the second side of said third prism and the first side of said fourth prism, wherein said first optical film transmits light having a first color and a first polarization, transmits light having a second color and a first polarization, transmits light having a second color and a second polarization and reflects light having a first color and a second polarization; and
a second optical film situated between the second sides of said first and fourth prisms and between the second side of said second prism and the first side of said third prism, wherein said second optical film transmits a first color and reflects a second color.

6. Display system of claim 5 further comprising:
a one half wave retarder proximate to a third side of said first prism; and
a switchable one-half wave retarder proximate to a third side of said third prism.

7. Display system of claim 6 wherein:
a first light of a first view, having a first said second prism through a third side, passes through said first and second optical film in either order, and exits from said fourth prism through a third side;
a second light of a second view, having a first color and a first polarization, passes through said one half wave retarder, said second light having a second polarization, enters said first prism through a third side, is reflected by said first optical film and passes through said second optical film in either order, and exits from said fourth prism through the third side; and
a third light of a common view, having a second color and a first polarization, passes through said switchable one half wave retarder that alternates between an "on" state and an "off" state, the third light going through said switchable retarder in the "on" state changes from the first polarization to a second polarization, enters said third prism through a third side, is reflected by said second optical film and passes through said first optical film in either order, and exits from said fourth prism through the third side; and
the third light going through said switchable retarder in the "off" state enters said third prism through the third side, is reflected by said second optical film and passes through said first optical film in either order, and exits from said fourth prism through the third side.

8. Display system of claim 7 further comprising a one quarter wave retarder proximate to the third side of said fourth prism wherein:
the first and third light, exiting said fourth prism through the third side and having the first polarization enter said one quarter wave retarder and exit said one quarter wave retarder having a third polarization; and
the second and third light, exiting said fourth prism through the third side and having the second polarization, enter said one quarter wave retarder and exit said one quarter wave retarder, having a fourth polarization.

9. Display system of claim 8 wherein:
the first color is red and green;
the second color is blue;
the first polarization is a linear polarization having a p orientation;
the second polarization is a linear polarization having an s orientation;
the third polarization is a left circular polarization; and
the fourth polarization is a right circular polarization 10. A full color, three dimensional display system comprising:
first source means for providing a first light of a first image having a first color and a first polarization;
second source means for providing a second light of a second image, having a first color and a second polarization;
third source means for providing a third light of a common third image, having a second color and a polarization alternating between the first and second polarizations; and
projection means for projecting first, second and third light on to a display means for displaying a resultant image.

11. Display system of claim 10 wherein a viewer looking at the display means with one eye through a first lens having the first polarization and looking at said display means with another eye through a second lens having the second polarization is enabled to see a full-color, three-dimensional fourth image composed of first, second and third images.

12. Display system of claim 11 wherein the third source means comprises a polarization changing means for alternating the polarization of the third light between the first and second polarizations.

* * * * *

UNITED STATES PATENT AND TRADEMARK OFFICE
CERTIFICATE OF CORRECTION

PATENT NO. : 5,074,645
DATED : December 24, 1991
INVENTOR(S) : Ronald S. Gold, et al It is certified that error appears in the above-indentified patent and that said Letters Patent is hereby corrected as shown below:

Column 7, line 41, after "having a first" insert --color and a first polarization enters--

Signed and Sealed this

Twenty-ninth Day of June, 1993

Attest:

MICHAEL K. KIRK

Attesting Officer        Acting Commissioner of Patents and Trademarks